(12) United States Patent
Adolfsson et al.

(10) Patent No.: US 8,479,863 B2
(45) Date of Patent: Jul. 9, 2013

(54) OCCUPANT RESTRAINT SYSTEM WITH BELT GUIDE ACTUATOR

(75) Inventors: Peter Adolfsson, Hisings Backa (SE); Gert Aldeborg, Uddevalla (SE)

(73) Assignee: Volvo Car Corporation, Goeteborg (SE)

( * ) Notice: Subject to any disclaimer, the term of this patent is extended or adjusted under 35 U.S.C. 154(b) by 0 days.

(21) Appl. No.: 13/406,868

(22) Filed: Feb. 28, 2012

(65) Prior Publication Data

US 2012/0217787 A1 Aug. 30, 2012

(30) Foreign Application Priority Data

Feb. 28, 2011 (EP) ..................................... 11156168

(51) Int. Cl.
*B60R 21/00* (2006.01)
(52) U.S. Cl.
USPC ............................. 180/268; 280/806; 297/483
(58) Field of Classification Search
USPC ............... 180/268; 280/806, 807, 808, 801.2, 280/804; 297/480, 483
See application file for complete search history.

(56) References Cited

U.S. PATENT DOCUMENTS

| | | | | | |
|---|---|---|---|---|---|
| 4,166,642 | A | * | 9/1979 | Jahn et al. ...................... | 280/806 |
| 5,544,917 | A | * | 8/1996 | Loxton et al. .............. | 280/801.2 |
| 5,749,601 | A | * | 5/1998 | Knoll et al. .................... | 280/805 |
| 6,527,298 | B2 | * | 3/2003 | Kopetzky ....................... | 280/806 |
| 6,705,645 | B2 | * | 3/2004 | Motozawa et al. ........... | 280/806 |
| 7,137,648 | B2 | * | 11/2006 | Schulz et al. .................. | 280/805 |
| 7,331,610 | B2 | * | 2/2008 | Herrmann ...................... | 280/806 |
| 7,618,097 | B2 | * | 11/2009 | Ghatge .......................... | 297/473 |
| 2006/0289220 | A1 | * | 12/2006 | Oota et al. ..................... | 180/274 |
| 2012/0217733 | A1 | * | 8/2012 | Adolfsson et al. ............ | 280/806 |

FOREIGN PATENT DOCUMENTS

EP 0374893 A2 6/1990
JP 1229744 A 9/1989

OTHER PUBLICATIONS

European Patent Office, European Search Report for the corresponding EP Patent Application No. EP 11 15 6168 mailed Oct. 6, 2011.

* cited by examiner

*Primary Examiner* — Drew Brown
(74) *Attorney, Agent, or Firm* — Brooks Kushman P.C.

(57) ABSTRACT

An occupant restraint system for a vehicle seat has a belt with a shoulder-belt portion extending diagonally across the seat between an upper portion of first side of the seat and a lower portion of a second side of the seat. An upper belt guide is mounted adjacent to the upper first side of the seat and engages the shoulder-belt to allow it to slide along the guide during belt retraction and extension. A safety sensor/control system generates a signal indicating a condition requiring improved occupant restraint in the seat. A guide actuator is activated in response to the safety sensor/control system signal and displaces the upper belt guide in a transverse direction relative to the seat. The displacement of the guide moves the shoulder-belt portion closer to the neck and/or shoulder of the seat occupant to more securely restrain the occupant.

20 Claims, 10 Drawing Sheets

OCCUPANT RESTRAINT SYSTEM WITH BELT GUIDE ACTUATOR

CROSS-REFERENCE TO RELATED APPLICATIONS

This application claims foreign priority benefits under 35 U.S.C. §119(a)-(d) to EP 11156168.4, filed Feb. 28, 2011, the disclosure of which is hereby incorporated by reference in its entirety.

TECHNICAL FIELD

The present disclosure relates to an occupant restraint system for a seat.

BACKGROUND

Vehicle seats of today, such as seats for cars, trucks, aircraft, et cetera, are often furnished with one or more occupant restraint systems that most commonly include one or more seat belts. Generally, a front seat of a vehicle is provided with one seat belt system whereas a vehicle back seat, since it is typically a bench seat, may be provided with a plurality of seat belt systems, one for each seating position.

Occupant restraint systems also often comprise a safety belt tensioner (sometimes also referred to as a pre-tensioner) operative to tension the seat belt in preparation for a vehicle acceleration/deceleration (to include a collision) to thereby reduce the motion of an occupant of the seat equipped with the occupant restraint system. Moreover, the reversible tensioning of the safety belt may be used to haptically communicate to the occupant that the vehicle may be about to be involved in a collision.

In order to protect an occupant of a vehicle seat in an appropriate manner, the seat belt generally has to assume a suitable safety belt configuration prior to, or at least during the initial portion of, the possible deceleration. For instance for three-point or four-point belts, such a suitable safety belt configuration generally implies that a portion of the safety belt which extends diagonally downwards across the occupant's torso is located close to the neck of the occupant.

SUMMARY

In a first disclosed embodiment, an occupant restraint system for a vehicle seat comprises a belt having a shoulder-belt portion extending diagonally across the seat between an upper portion of first side of the seat and a lower portion of a second side of the seat. An upper belt guide is adapted to be mounted adjacent to the upper first side of the seat and engages the shoulder-belt to allow the belt to slide along the guide during belt retraction and extension. A safety sensor/control system generates a signal indicative of a condition requiring improved occupant restraint in the seat. A guide actuator is activated in response to the signal of the safety sensor/control system and displaces the upper belt guide in a direction having a component coinciding with a transverse direction of the seat. The displacement of the guide moves the shoulder-belt portion closer to the neck and/or shoulder of the seat occupant to more securely restrain the occupant.

In another disclosed embodiment, an occupant restraint system further comprises a reversible belt tensioner activated in response to the signal of the safety sensor/control system. The belt tensioner reversibly applies tension to the belt to further contribute to the occupant's safety.

In another disclosed embodiment, a vehicle seat and restraint assembly comprises a seat having a seatback with a first side and an opposite second side, a belt for restraining an occupant in the seat, and an upper belt guide mountable adjacent to an upper portion of the seatback first side and engaging a shoulder-belt portion of the belt to allow the belt to slide along the guide during belt refraction and extension. A safety sensor/control system generates a signal indicative of a vehicle condition requiring improved occupant restraint in the seat, and a guide actuator is activated in response to the signal of the safety sensor/control system to displace the upper belt guide in a transverse direction toward the second side of the seat.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

It should be noted that the appended drawings are not necessarily drawn to scale and that the dimensions of some features of the present invention may have been exaggerated for the sake of clarity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
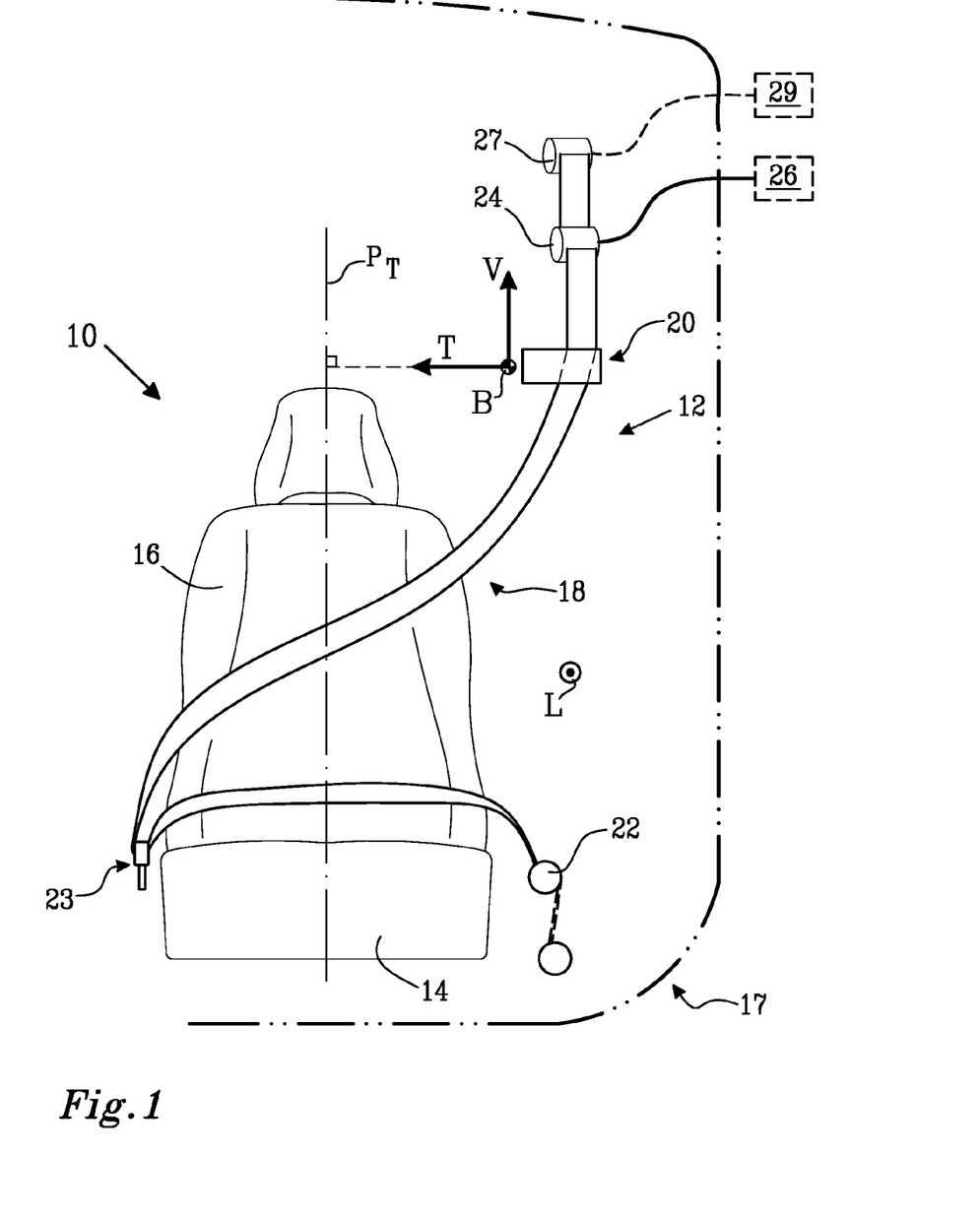
FIG. 1 discloses an embodiment of an occupant restraint system in a comfort configuration.

FIG. 1 illustrates a seat 10 provided with an embodiment of an occupant restraint system 12 according to the present invention. The seat 10 comprises a bottom portion 14 and a backrest portion 16. The seat 10 has a vertical dimension along a vertical axis V and a transverse dimension along a transverse axis T. As may be seen in FIG. 1, the vertical axis V is directed from the bottom portion 14 towards the backrest portion 16 of the seat 10. The seat 10 and the occupant restraint system 12 are preferably located in a vehicle 17 such as a car.

Moreover, the seat 10 has a vertically extending transverse center plane $P_T$ which, when a person occupies the seat, extends between the occupant's left and right hand sides. The seat 10 also has a longitudinal axis L which is perpendicular to both the vertical axis V and the transverse axis T.

When the seat 10 is mounted in a vehicle (not shown in FIG. 1), the longitudinal axis L generally coincides with the intended direction of travel of the vehicle. In such an implementation of the seat 10, the transverse center plane $P_T$ extends in a vertical direction and in the intended direction of travel of the vehicle.

As may be seen in FIG. 1, the occupant restraint system 12 comprises a belt 18, an upper guide arrangement 20 and a second guide arrangement 22. Moreover, the occupant restraint system 12 is configured such that when the occupant restraint system 12 is mounted with a seat 10, the upper and second guide arrangements 20, 22 are located on the same side of the transverse center plane $P_T$ and the upper guide arrangement 20 is located above—i.e. on a higher level in the vertical direction V than—the second guide arrangement 22.

FIG. 1 further illustrates that the transverse axis T is perpendicular to the transverse center plane $P_T$ and extends in a direction from the upper guide arrangement 20 towards the transverse center plane $P_T$. Moreover, FIG. 1 also illustrates that the system 12 comprises a backward direction B extending from the upper guide arrangement 20 in a direction perpendicular to both the vertical direction V and the transverse direction T such that vertical direction V, the transverse direction T and the backward direction B together form a right-handed coordinate system.

As may be realized from FIG. 1, the backward direction B is generally the inverse direction of the longitudinal axis L. As such, when the seat 10 is mounted in a vehicle 17, the backward direction B generally is the inverse direction of the intended direction of travel of the vehicle.

As used herein, the expression "guide arrangement" is an arrangement of the occupant restraint system to which a portion of the belt is attached and/or at which a portion of the safety belt deflects, i.e. changes direction. However, in preferred embodiments of the occupant restraint system of the present disclosure, the expression "guide arrangement" encompasses only arrangements at which a portion of the safety belt deflects.

The upper guide arrangement 20 may be attached to a portion of the vehicle structure adjacent to the upper portion or corner of the seat back 16, as shown, such as an outboard sidewall or a roof support pillar. For example, in the case where seat 10 is a seat for a vehicle driver or front row passenger, the upper guide arrangement may be connected to the vehicle B-pillar. Alternatively, upper guide arrangement 20 may be attached to the seat 10.

Moreover, the FIG. 1 embodiment of the present invention comprises a third guide arrangement 23 and the illustrated occupant restraint system 12 is configured such that when the occupant restraint system is mounted with a seat 10, the third guide arrangement 23 is located on the opposite side of the transverse centre plane $P_T$ as compared to the first and second guide arrangements 20, 22.

Further, the occupant restraint system 12 may further comprise a safety belt tensioner 24 adapted to reversibly tension the belt 18 in preparation for an actual or impending condition or situation which may indicate that the occupant should be securely restrained in the seat. Such situations may include an acceleration/deceleration event or a collision. However, in other embodiments of the present invention, the safety belt tensioner 24 may be omitted.

The purpose of the reversible tensioning is inter alia to position an occupant of the seat in a suitable restrained position and/or to position the safety belt in what will be referred to herein as a safety configuration prior to, or at least during the initial portion of, the possible crash or other event requiring more secure restraint.

The reversible tensioning of the safety belt may also be used to haptically communicate to the occupant that the vehicle may be about to be involved in a collision, or to alert the occupant to some other situation requiring the occupant's attention.

In the embodiment of the present invention illustrated in FIG. 1, the safety belt tensioner 24 is located with respect to the upper guide arrangement 20 such that—when following the extension of the safety belt 18 from the safety belt tensioner—components of the occupant restraint system 12 are arranged in the following order: the safety belt tensioner 24, the upper guide arrangement 20, the third guide arrangement 23 and the second guide arrangement 22. However, other embodiments of the present invention may have the components arranged in another order. Purely by way of example, the safety belt tensioner 24 may be located by the second guide arrangement 22. Furthermore, the safety belt 18 of the occupant restraint system 12 may be connected to more than one safety belt tensioner (not shown in FIG. 1).

Moreover, in the FIG. 1 embodiment of the present invention, the safety belt tensioner 24 is located above the upper guide arrangement 20. However, in other embodiments of the present invention, the safety belt tensioner 24 may be located on the same level, or below, the upper guide arrangement 20.

When the occupant restraint system 12 is in its operative condition (as shown in FIG. 1), the safety belt 18 is fastened so that a diagonal cross-seat portion of the safety belt extends diagonally (both laterally and vertically) across the seatback 16 between upper guide arrangement 20 and third guide arrangement 23. This diagonal cross-seat portion is commonly referred to as a "shoulder-belt" to distinguish it from the lower portion of the belt that extends across seat bottom portion 14 between lower guide arrangements 22 and 23 (the "lap-belt"). It may often be the case, however, that the entire belt 18 (both the shoulder-belt and the lap-belt) is a single, contiguous length of material.

The reversible safety belt tensioner 24 may be implemented in a plurality of different ways. Purely by way of example, the safety belt tensioner may be actuated by hydraulic and/or electric means in order to tension, often by retraction of, the safety belt 18. Generally, the safety belt tensioner 10 is in communication with a pre-crash sensor/control system 26 operative to control and/or communicate to at least the reversible safety belt tensioner 24 when the vehicle is subjected to a potentially unsafe situation.

The above communication may be achieved in a plurality of ways. Purely by way of example the pre-crash sensor/control system 26 and the reversible safety belt tensioner 24 may be directly or indirectly connected to one another by means of one or more cables, for instance an electrical and/or optical cable. Instead of, or in addition to, the use of cables, the pre-crash sensor/control system 26 and the reversible safety belt tensioner 24 may be in communication with one another via a wireless communication means.

Safety sensor/control system 26 may comprise a Restraints Control Module or other electronic controller that receives signals from one or more sensors and applies programmed instructions and logic to make safety system actuation decisions and control the operation of one or more safety systems, to include the present occupant restraint system. The pre-crash sensor/control system 26 may comprise an optical sensor, a radar (radio frequency) sensor, a LIDAR (laser) sensor or any other type of sensor suitable for detecting if the vehicle is subjected to an impending crash situation. Moreover the pre-crash sensor/control system 26 may comprise a combination of one or more sub-sensors each comprising a visual sensor, a radar sensor, a lidar sensor or any other type of sensor suitable for detecting if the vehicle is subjected to an impending crash situation.

The sensor/control system 26 may further comprise a sub-sensor adapted to detect driver impairment. Purely by way of example, such a sub-sensor may be adapted to detect an impaired driving behaviour (as exhibited by the vehicle weaving within a road lane or slow reflexes, for example) or it may be adapted to monitor the eye movements of a driver of the vehicle.

Again purely by way of example, the safety belt tensioner 24 may be adapted to reversibly tension the safety belt 18 such that a tension force of approximately 500 N or less, preferably 300 N or less, is obtained in the belt 18.

A safety belt tensioner 24 adapted to reversibly tension the belt 18 to a tension force within the above ranges is hereinafter also referred to as a pre-pretensioner.

The pre-crash sensor/control system 26 is adapted to detect or predict an unsafe or potentially unsafe situation and generate a signal that is sent to the safety belt tensioner (either directly or indirectly) such that it is actuated to reversibly tension the safety belt 18.

The FIG. 1 occupant restraint system 12 further comprises an additional safety belt tensioner 27. The additional safety belt tensioner 27 is adapted to tension the safety belt 18 in the event of an occurring and/or unavoidable crash situation. The additional safety belt tensioner 27 may be in communication with a crash sensor/control system 29 adapted to detect when the vehicle hosting the occupant restraint system 12 is involved in an occurring and/or unavoidable crash situation. The crash sensor/control system 29 may, for example, comprise force, pressure and/or strain sensors (not shown) adapted to detect when at least a portion of the vehicle hosting the system is imparted a load and/or a deflection.

In some implementations of the sensor/control systems 26, 29, the pre-crash sensor/control system 26 and the crash sensor/control system 29 may have at least one sub-sensor in common. Moreover, in other implementations the pre-crash sensor/control system 26 and the crash sensor/control system 29 may be one and the same sensor/control system or sensor/control assembly.

The additional safety belt tensioner 27 may be adapted to tension the safety belt 18 such that a tension force of approximately 2 kN or less is obtained in the belt 18. The additional safety belt tensioner 27 may be implemented in a plurality of different ways. Purely by way of example, the safety belt tensioner may be actuated by pyrotechnic, hydraulic and/or electric means in order to tension, often by retraction of, the safety belt 18. The above tension of the safety belt 18 by the additional safety belt tensioner 27 may be irreversible.

Figure 2:
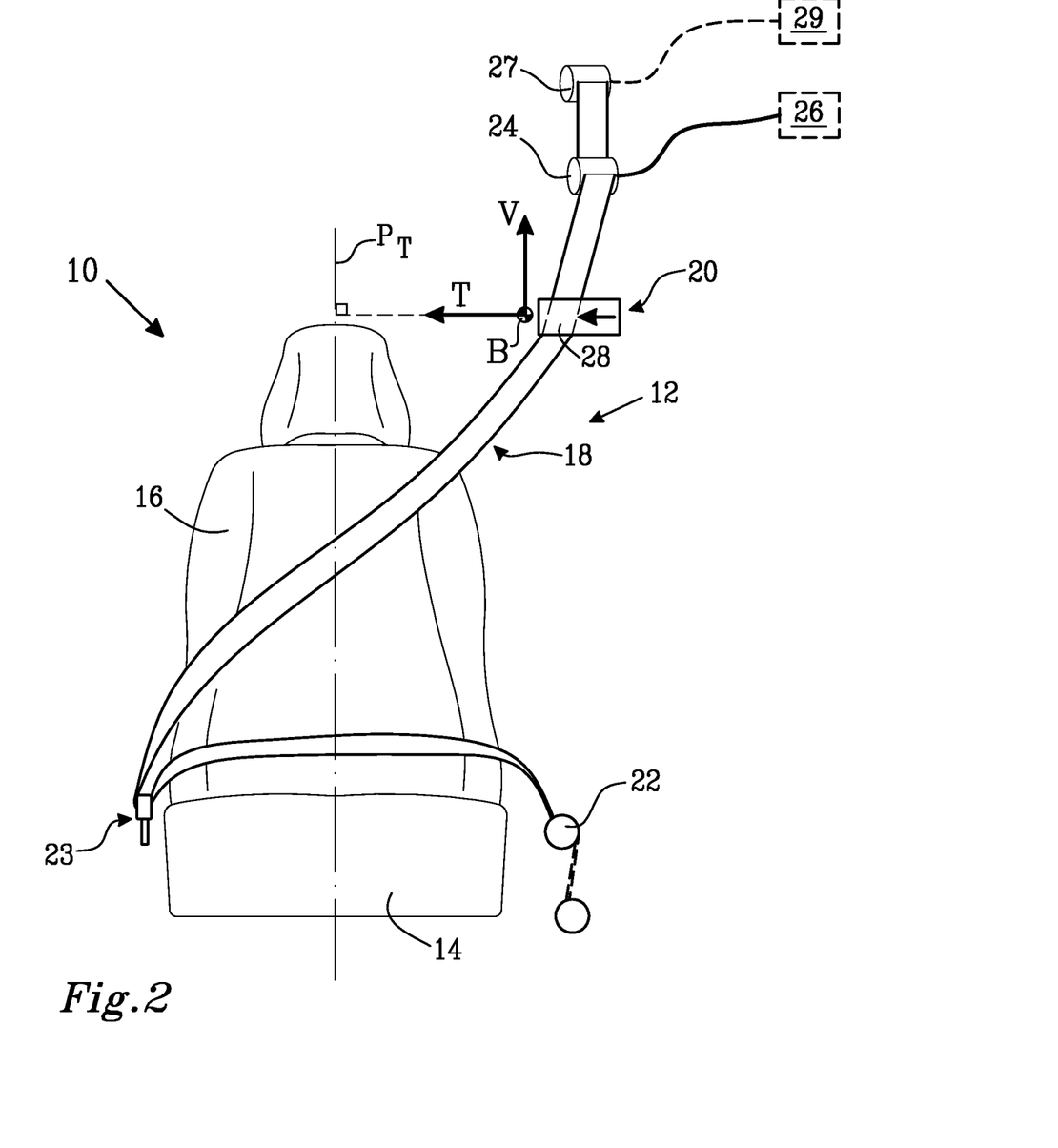
FIG. 2 discloses the FIG. 1 embodiment in a pre-safety configuration.

FIG. 2 illustrates the FIG. 1 embodiment of the present invention when the safety belt tensioner 24 has been actuated. As may be seen in FIG. 2, the upper guide arrangement 20 is configured such that it allows an upper end 28 of the shoulder-belt portion of the belt 18, which upper end 28 is in contact with the upper guide arrangement 20, to be displaced in a direction at least partially coinciding with the transverse direction T and/or the backward direction B.

In the embodiment illustrated in FIG. 2, the upper shoulder-belt 28 is arranged to be displaced at least partially towards the transverse center plane $P_T$ in the transverse direction T when the belt pre-tensioning system is activated in response to a safety system determining that vehicle 17 is (or is about to be) involved in situation requiring more secure restraint of the seat occupant.

When the safety belt tensioner 22 tensions the belt 18, the belt assumes a safety configuration which is appropriate from an injury prevention point of view since a shoulder-belt portion of the safety belt which is adapted to extend diagonally across the seat back 16 (and hence diagonally across the seat occupant's torso) will be moved inboard (away from a portion on the vehicle structure to which the guide arrangement 20 is mounted) such that its upper portion will be located closer to the neck of the occupant, as compared to the comfort configuration illustrated in FIG. 1.

In order to obtain an appropriate distinction between the comfort configuration and the safety configuration, the upper guide arrangement 20 may be adapted to allow a displacement of the upper shoulder-belt portion 28 in a direction at least partially coinciding with the transverse direction T and/or the backward direction B which is at least 0.2 times, preferably at least 0.4 times and more preferred at least 0.6 times, the width of the belt portion 28. To this end, it should be noted that a safety belt may generally have a width of 4-8 cm.

Figure 3:
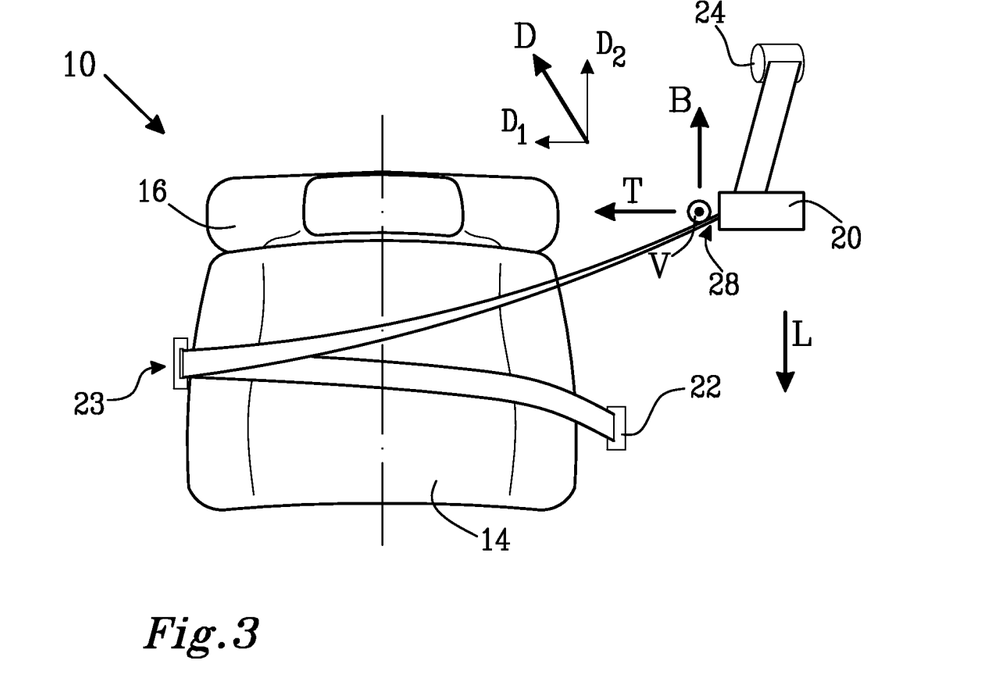
FIG. 3 discloses a portion of the FIG. 1 embodiment, as seen from above.

FIG. 3 is a top view of a portion of the FIG. 1 seat 10 with the occupant restraint system. FIG. 3 illustrates the transverse direction T, the backward direction B, the vertical direction V and the longitudinal direction L of the system 12. Moreover, FIG. 3 illustrates a displacement direction D having a first horizontal component $D_1$ which coincides with, i.e. is parallel with and extends in the same direction as, the transverse direction T and a second horizontal component $D_2$ which coincides with the backward direction B. As such, a displacement direction "at least partially coinciding with the transverse direction T and/or said backward direction B" is intended to encompass displacement directions D wherein:

the displacement direction D has a horizontal component which coincides with the transverse direction T;

the displacement direction D has a horizontal component which coincides with the backward direction B, or the displacement direction D has a first horizontal component $D_1$ which coincides with the transverse direction T and a second horizontal component $D_2$ which coincides with the backward direction B.

A "horizontal component" is intended to encompass components which extend in a direction perpendicular to the vertical axis or direction V.

The upper shoulder-belt portion 28 may, in some embodiments, be displaced in a displacement direction D which also has a vertical component, i.e. a component parallel to the vertical direction V. In the embodiments of the present invention presented hereinbelow, the displacement direction is generally coinciding with the transverse direction T but any one of the below embodiments could be adjusted so as to achieve a displacement direction D which coincides with the backward direction B or which has a first component $D_1$ which coincides with the transverse direction T and a second component $D_2$ which coincides with the backward direction B.

Embodiments of occupant restraint systems configured to assume a comfort configuration as well as a safety configuration will be presented hereinbelow.

Figure 4A:
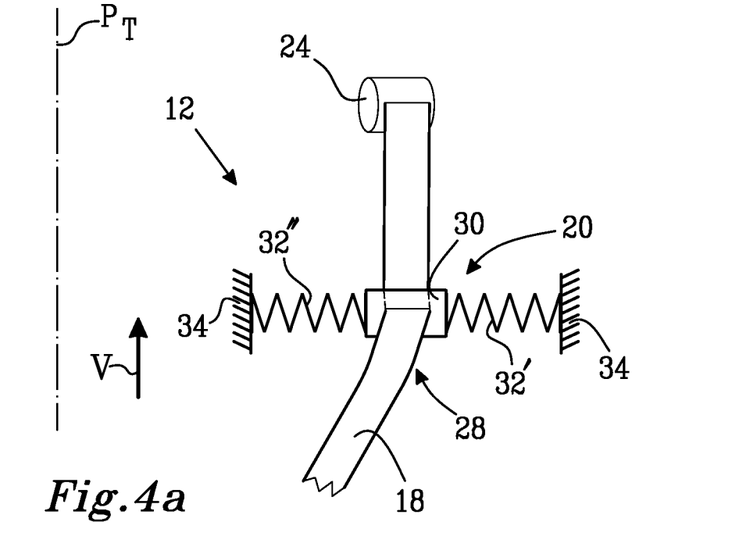
FIG. 4a-4b discloses a portion of another embodiment of an occupant restraint system.
Figure 4B:
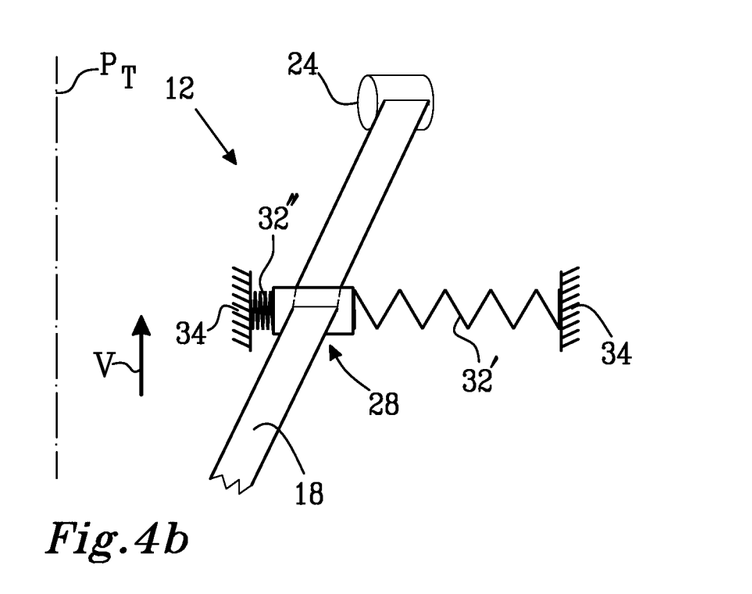

FIG. 4a and FIG. 4b illustrate a portion of an embodiment of an occupant restraint system in a comfort configuration. The occupant restraint system 12 comprises an upper guide arrangement 20 which in turn comprises a guide member 30. The guide member 30 is in FIG. 4a implemented as a "keeper" through which the safety belt 18 runs, the belt 18 being free to slide along or through the guide member during retraction and extension of the belt. The upper guide may have a closed perimeter such that it completely surrounds the safety belt 18 or it may include an opening in its perimeter such that the belt may be moved into and out of engagement with the upper guide. If the upper guide is open, the opening thereof preferably faces away from the transverse center plane $P_T$. The FIG. 4a embodiment further comprises a biasing element, which is implemented as two springs 32', 32" connected to the guide member 30. FIG. 4a also illustrates that the biasing element extends between the guide member 30 and a support member 34. As such, the two springs 32', 32" may be regarded as forming part of a compliant portion of the upper guide arrangement 20 in the FIG. 4a and FIG. 4b embodiment.

The support member 34 may be (or may be rigidly connected to) a portion of the vehicle structure adjacent to the upper portion or corner of the seat back 16, as shown, such as an outboard sidewall or a roof support pillar. For example, in the case where seat 10 is a seat for a vehicle driver or front row passenger, the support member may be (or may be rigidly connected to) the vehicle B-pillar. Alternatively, support member 34 may be at least one of a component of the upper guide arrangement 20 or the seat 10. In the implementation of the biasing element illustrated in FIG. 4a, the springs 32', 32" extend substantially horizontally, i.e. in a direction substantially perpendicular to the vertical direction V, and the biasing element comprises an inner spring 32" located between the guide member 30 and the transverse center plane $P_T$ and an outer spring 32' which is located on the opposite side of the guide member 30.

FIG. 4b illustrates the FIG. 4a embodiment when the safety belt tensioner 24 has been actuated so as to reversibly tension the safety belt 18. As may be gleaned from FIG. 4b, following the tensioning of the safety belt 18, the inner spring 32" is compressed whereas the outer spring 32' is extended such that the first guide member 30 is displaced towards the transverse centre plane $P_T$.

Figure 5A:
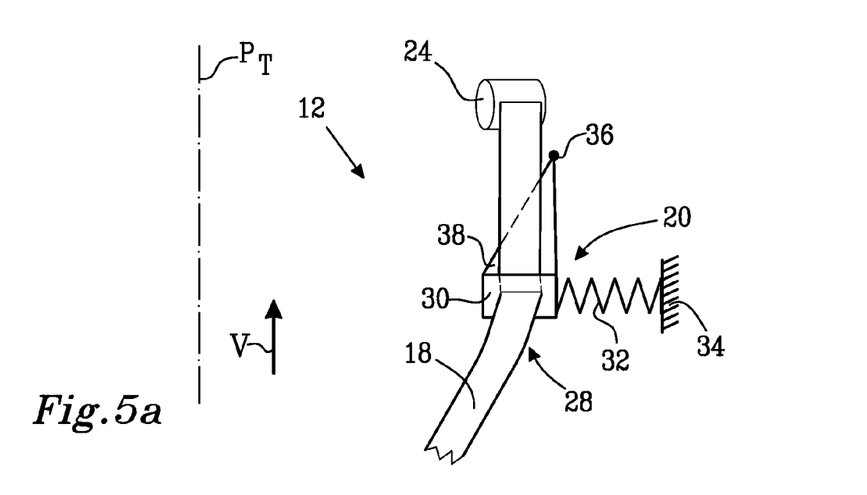
FIG. 5a-5c discloses a portion of a further embodiment of an occupant restraint system.
Figure 5B:
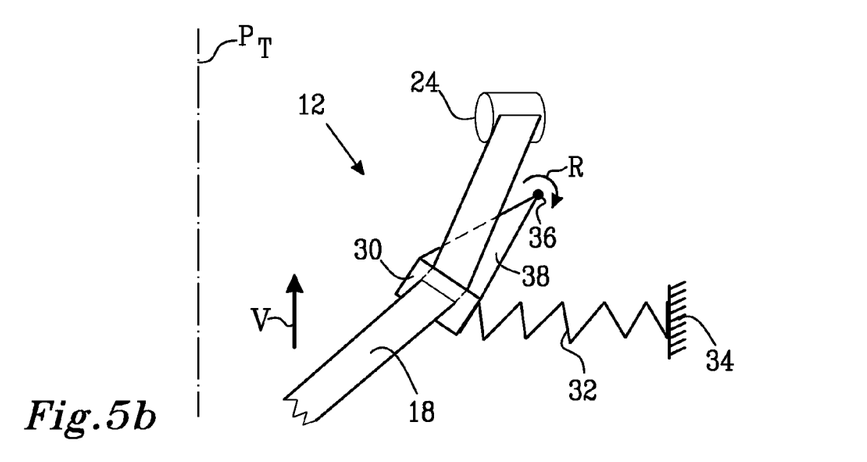

FIG. 5a and FIG. 5b illustrate a portion of another embodiment of an occupant restraint system comprising a support arm 38 pivotally mounted at its upper end to a portion of the vehicle structure (such as, for example, a B-pillar) at a pivot point 36. Support arm 38 extends generally downward and the guide member 30, which again is implemented as a keeper, is attached to a lower end of the support arm 38. The geometry and mounting configuration of support arm 38 are such that the guide member 30 is located below pivot point 36 and in the desired comfort position. A biasing element 32 is connected to the guide member 30 or to the support arm 38, either directly or indirectly, such that the guide member 30 may be kept substantially in the comfort position illustrated in FIG. 5a during normal driving conditions.

Figure 5C:
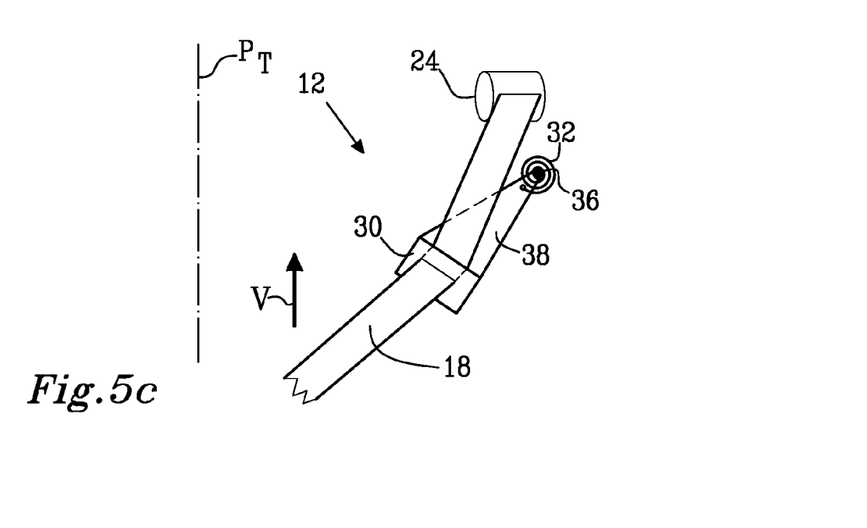

When the safety belt tensioner 24 is actuated to apply tension to the safety belt 18, the biasing element 32 yields or deflects to allow the support arm 38 and attached guide member 30 to pivot about point 36 in a direction as indicated by arrow R. The implementation of the biasing element 32 illustrated in FIG. 5b is a spring directly or indirectly connected with the guide member 30 or support arm 38 and a support member 34. FIG. 5c illustrates an alternative implementation wherein the biasing element 32 is a torsion spring located adjacent to pivot point 36 and acting on the support arm 38. In one implementation of a torsion spring arrangement, one end of the torsion spring may be connected to the guide member 30 whereas the other may be connected to a support member, such as a portion of the upper guide arrangement 20, which is prevented from rotation around the pivot 36.

Figure 6A:
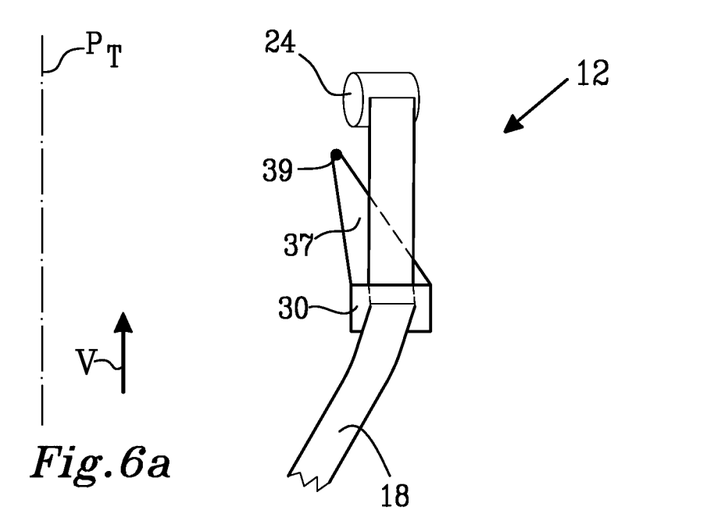
FIG. 6a-6b discloses a portion of another embodiment of an occupant restraint system.
Figure 6B:
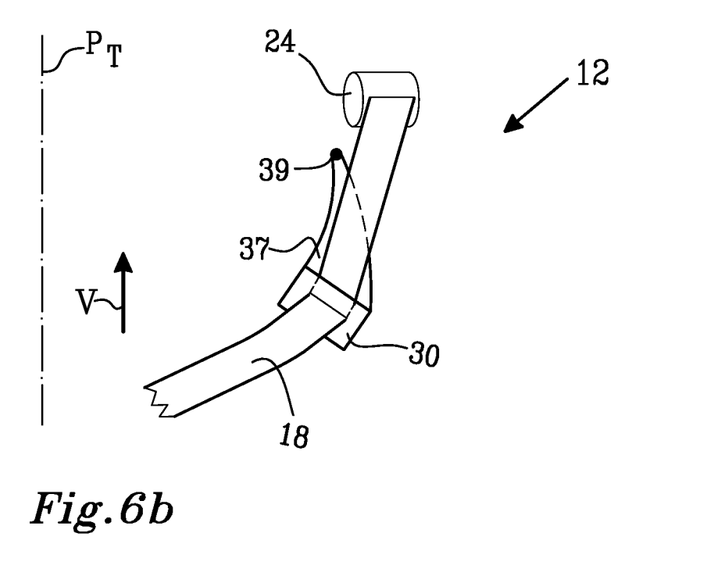

FIGS. 6a and 6b show an alternative to a pivoting support arm as discussed hereinabove wherein a guide member 30 is connected to a deflectable support arm 37 having its upper end non-pivotally mounted to a portion of the vehicle structure by a connection means 39, such as bolt, rivet, weld joint, et cetera. Purely by way of example, the deflectable support arm 37 may be made of a plastics material and/or a metal and is adapted to bend or deflect inwards and/or backwards, e.g. in a direction towards the transverse center plane $P_T$, when the safety belt tensioner 24 tensions the safety belt 18. The support arm 37 is shown in the bent or deflected condition in FIG. 6b.

An occupant restraint system in which the upper guide arrangement comprises a support arm which the guide actuator is adapted to pivot implies that the upper guide arrangement may be made rather compact and thus not require much space for e.g. installation or use. This is advantageous since the upper guide arrangement is often located in a position in a vehicle with limited space.

Figure 7A:
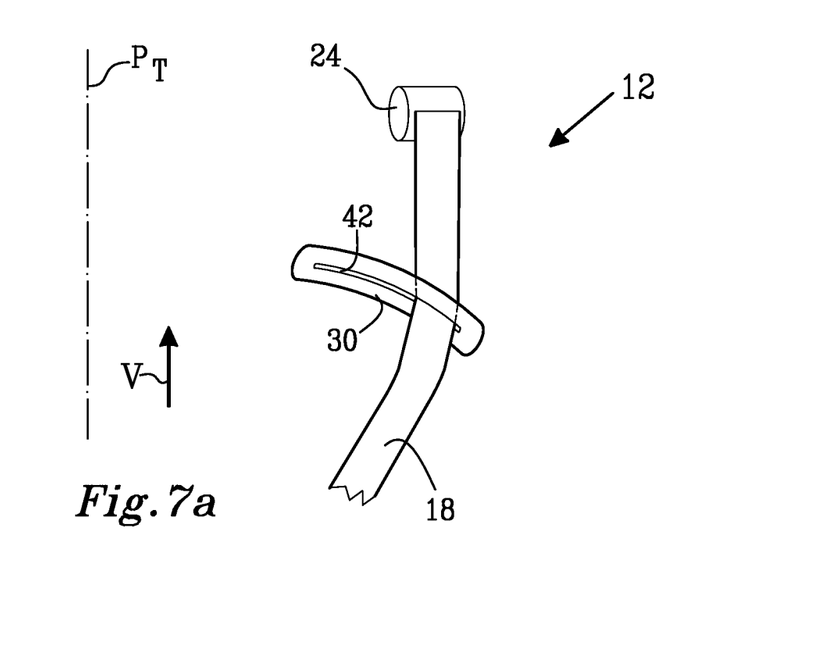
FIG. 7a-7b discloses a portion of a further embodiment of an occupant restraint system.
Figure 7B:
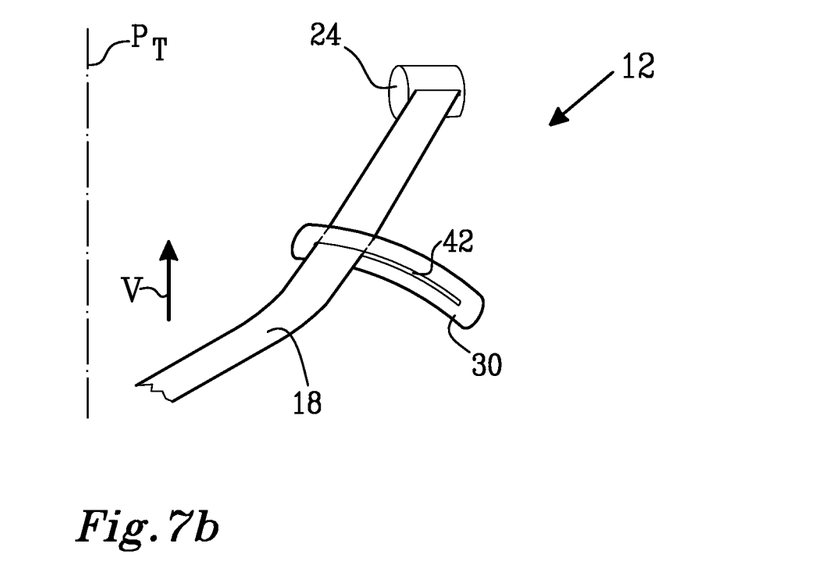

FIGS. 7a and 7b illustrate a portion of a further embodiment of an occupant restraint system comprising guide member 30 having a slot 42 through which a portion of the safety belt 17 extends. The slot 42 has a dimension in at least a direction perpendicular to the transverse center plane $P_T$ which dimension is at least 2 times, preferably 3 times, greater than the width of the belt. Moreover, the FIG. 7a slot 42 preferably is inclined in relation to a horizontal plane, i.e. a plane extending perpendicular to the vertical direction V, such that the portion of the slot 42 which is located towards the transverse center plane $P_T$ is above, i.e. on a higher elevation in the vertical axis, than the portion of the slot 42 which is located away from the transverse center plane $P_T$. In the implementation if the slot 42 illustrated in FIG. 7a, the slot 42 is arcuate.

During normal driving conditions, the safety belt 18 is, due to friction forces between the safety belt 18 and the circumference of the slot 42, kept in a position as illustrated in FIG. 7a. Thus, the safety belt 18 is retained in a portion of the slot 42 which is located away from the transverse center plane $P_T$. When the safety belt tensioner 24 tensions the belt 18, the safety belt 18 slides in the slot 42 and is subsequently displaced towards the transverse center plane $P_T$ to assumes a safety configuration in which the safety belt 18 occupies a portion of the slot 42 which is located towards the transverse center plane $P_T$. The slot 42 may be regarded as forming part of a compliant portion of the upper guide arrangement 20 in the FIGS. 7a and 7b embodiment.

In the second group of embodiments presented hereinbelow, the occupant restraint system comprises a guide actuator adapted to displace at least the upper shoulder-belt portion 28 in a direction at least partially coinciding with the transverse direction T and/or the backward direction B in response to a signal from the pre-crash sensor/control system 26. As such, instead of, or in addition to, comprising a member that is compliant in order to passively alter the position of the belt portion when the safety belt tensioner 24 is actuated, the second group of embodiments comprises an actuator operative to actively displace at least the upper shoulder-belt portion 28.

One advantage with the second group of embodiments is that it does not require a pre-pretensioner in order to function properly. Thus, the guide actuator may be used for positioning the safety belt in a pre-safety configuration in the event of an impending crash and the system 12 may comprise an additional safety belt tensioner 27 adapted to tension the seat belt 18, should a collision actually occur. Moreover, the guide actuator may be used for displacing the belt portion 28 and possibly also for achieving an initial pretension in the seat belt 18.

Should a system comprise a guide actuator as well as a reversible safety belt tensioner 24, such a system would be able to be adjusted to different kind of occupants.

Purely by way of example, for a small occupant with a low weight, such as a child, a low tensioning of the safety belt and a large displacement of the first guide member may be desired.

Moreover, for a large occupant with a large weight, such as an obese person, a large tensioning of the safety belt may be required but only a small displacement of the first guide member may be needed in order to obtain a suitable pre-safety configuration.

A system comprising a guide actuator as well as a reversible safety belt tensioner may be adjusted so as to achieve at least one of the above two displacement/tensioning combinations.

Figure 8A:
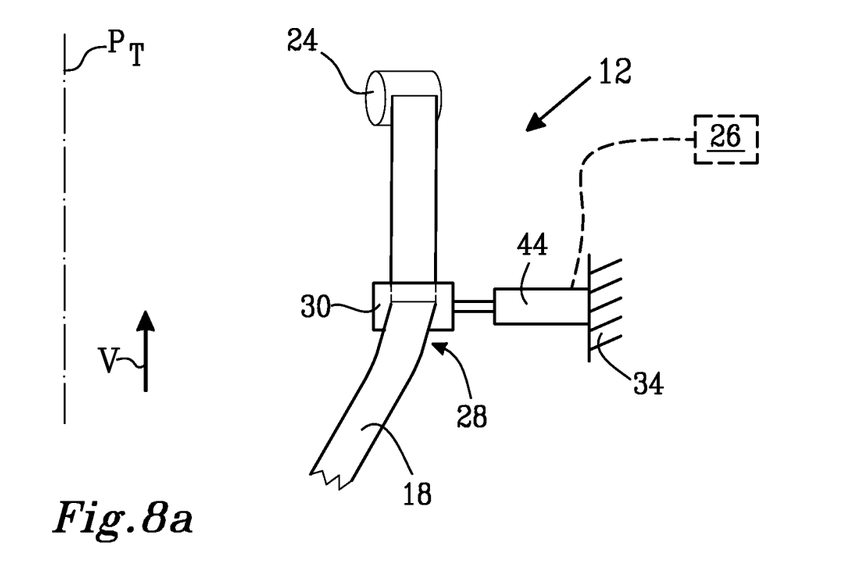
FIG. 8a-8b discloses a portion of another embodiment an occupant restraint system.
Figure 8B:
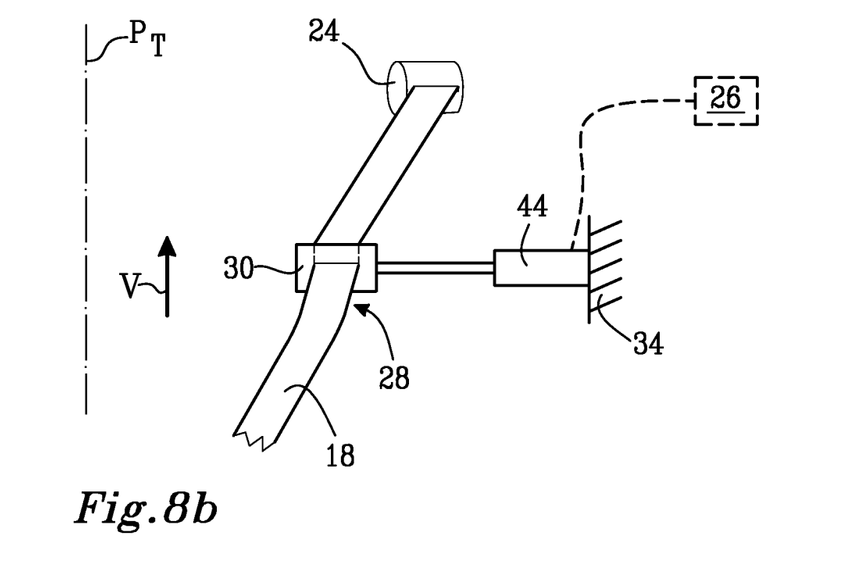

FIGS. 8a and 8b illustrate a portion of a further embodiment of an occupant restraint system comprising an upper guide member 30, again exemplified by a closed or open keeper. The upper guide member 30 is connected to a guide actuator 44 which in turn is connected to a support member 34. The support member 34 may be (or may be rigidly connected to) a portion of the vehicle structure adjacent to the upper portion or corner the seat back 16, as shown, such as a roof support pillar. For example, in the case where seat 10 is a seat for a vehicle driver or front row passenger the support member may be (or may be rigidly connected to) the vehicle B-pillar. Alternatively, support member 34 may be at least one of a component of the upper guide arrangement 20 or the seat 10.

The guide actuator 44 is adapted to communicate with, or at least to receive a situation from, the pre-crash sensor/control system 26. Examples of implementations of a pre-crash sensor/control system have already been presented in conjunction with FIG. 1 and need not be further discussed here. The guide actuator 44 and the pre-crash sensor/control system 26 may be directly or indirectly connected to one another by means of one or more cables, for instance an electrical and/or optical cable. Instead, or in addition, to the use of cables, the pre-crash sensor/control system 26 and the reversible guide actuator 44 may be in communication with one another via a wireless communication means (not shown).

In the implementation of the guide actuator 44 illustrated in FIG. 8a, the actuator extends substantially horizontally, i.e. in a direction substantially perpendicular to the vertical direction V. The guide actuator 44 may extend in the transverse direction T, or may extend at least in the backward direction B or in a direction with a first component (not shown) coinciding with the transverse direction T and a second component (not shown) coinciding with the backward direction B. Moreover, the guide actuator 44 may have an extension direction with a component parallel to the vertical direction V.

FIG. 8b illustrates the FIG. 8a embodiment when the guide actuator 44 is extended such that the upper guide 30 is displaced towards the transverse centre plane $P_T$ such that a pre-safety configuration of the safety belt 18 is obtained. The extension occurs in response to a signal or signals generated by the pre-crash sensor/control system 26 when it has been determined that the vehicle may be in an unsafe condition.

The guide actuator 44 may be implemented in a plurality of ways. Purely by way of example, the guide actuator 44 may comprise hydraulic and/or electric actuating means. Moreover, the guide actuator 44 may comprise a solenoid (not shown).

Figure 9A:
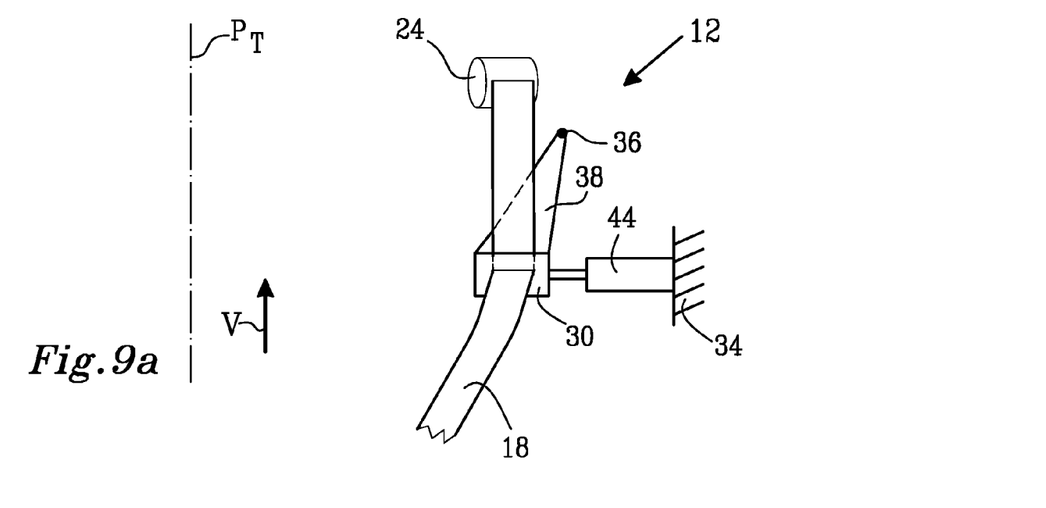
FIG. 9a-9c discloses a portion of further embodiments of an occupant restraint system, and FIG. 10 discloses a four-point occupant restraint system.
Figure 9B:
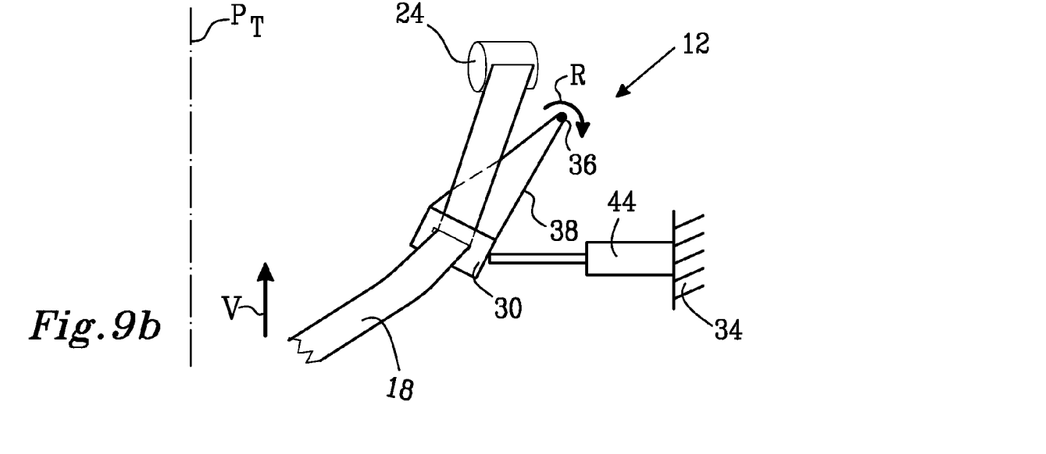
Figure 9C:
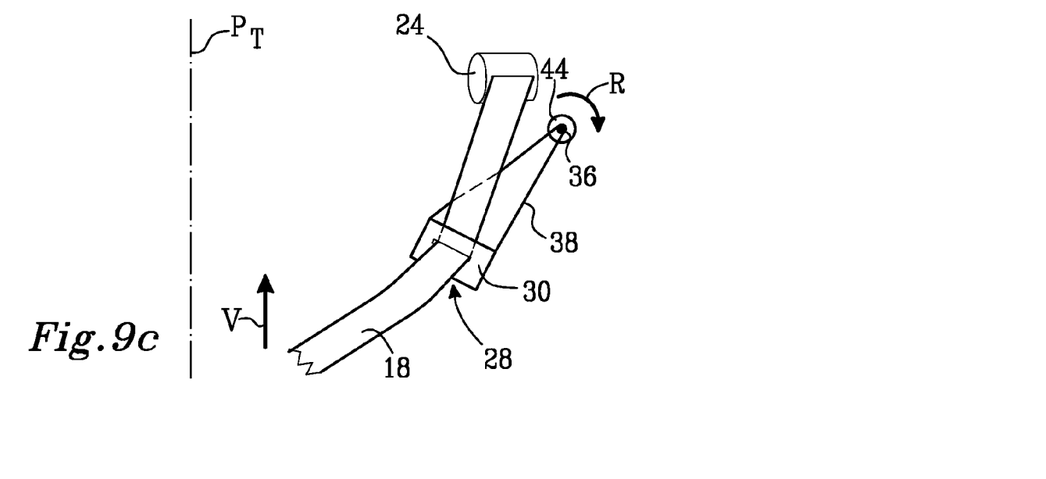

The guide actuator 44 may be used in implementations of the upper guide arrangement 20 wherein the upper guide 30 is pivotally connected to a pivot 36 via a support arm 38. To this end, reference is made to the implementations of the upper guide arrangement 20 illustrated in FIG. 9a-9c. The guide actuator 44 may be implemented so as to impart on the upper guide 30 and/or the pivoting support arm 38 a force in a rectilinear direction, as is exemplified in FIG. 9a and FIG. 9b, or to impart a torque on the support arm 38, as is exemplified in FIG. 9c.

The feature that the occupant restraint system may comprise a guide actuator indicates that the measures of a possible reversible tensioning and the reversible displacement, respectively, of the safety belt may be carried out by separate components of the occupant restraint system. Moreover, the guide actuator may in some embodiments of the present invention also be used to reversibly pre-tension the safety belt such that the reversible safety belt tensioner may be omitted.

Figure 10:
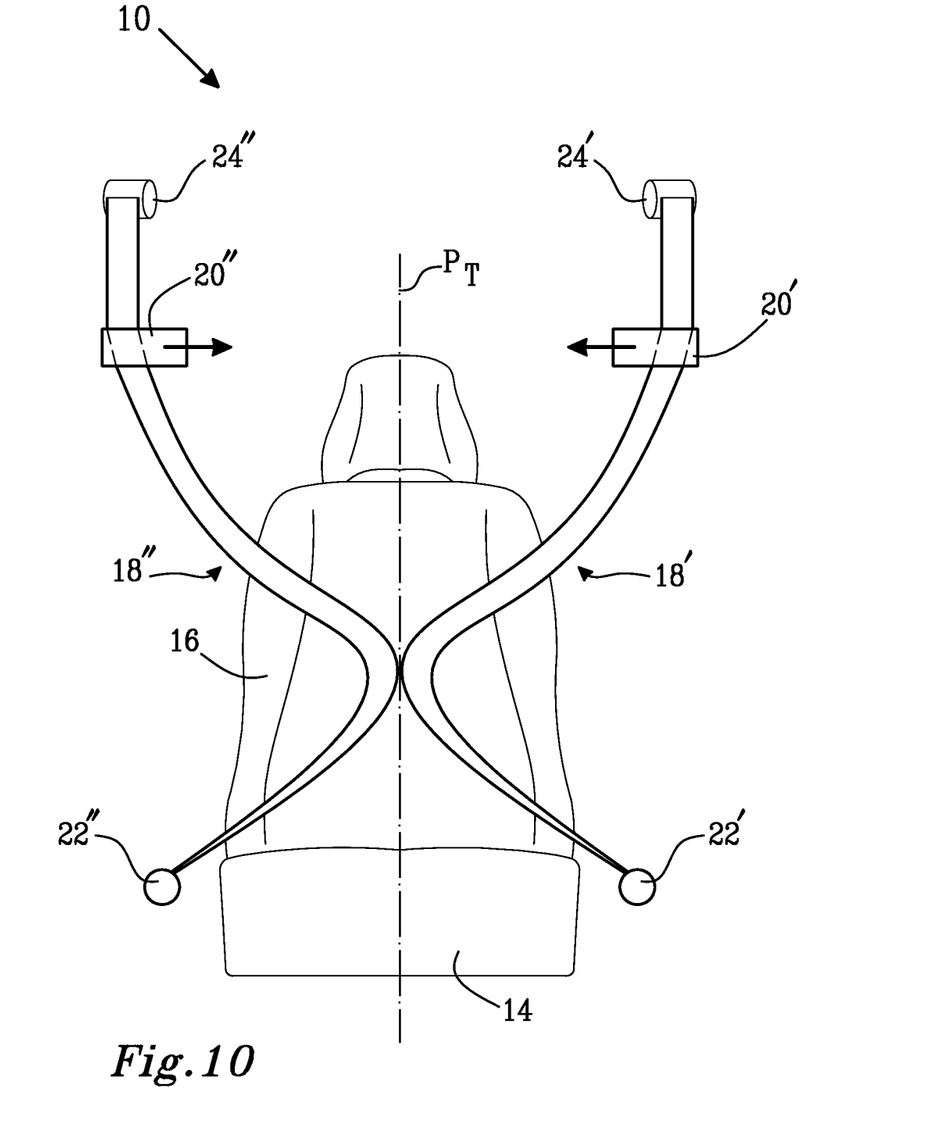

Furthermore, although the embodiments hereinabove relate to a three-point belt system, the invention is also applicable to other types of occupant restraint systems. To this end, reference is made to FIG. 10 illustrating an embodiment of the present invention. As may be seen in FIG. 10, the occupant restraint system 12 disclosed therein is a four-point belt system. The four-point belt system comprises two safety belts 18', 18", each one of which being connected to a separate safety belt tensioner 24', 24" and an upper guide arrangement 20', 20". Each of the safety belts 18', 18" includes a cross body portion extending between a respective upper guide arrangement 20', 20" and a connection point located near the transverse center plane $P_T$ of the seat 10. By means of an occupant restraint system according to the present disclosure, an appropriate comfort configuration of the safety belt may be obtained since, for instance, a diagonally extending portion of the safety belt may be located at a distance from an occupant's neck. However, in the event of a situation calling for more secure restraint of the seat occupant than that provided by the comfort condition, that portion of the safety belt is displaced towards the occupant's neck such that an appropriate safety configuration of the occupant restraint system is obtained. The occupant restraint system according to the present disclosure implies that the safety configuration may be assumed before the occupant of the seat hosting the occupant restraint systems begins to move forward during a rapid decoration of the vehicle, such as may occur during a crash.

Each one of the upper guide arrangements 20', 20" is adapted to allow a displacement of the corresponding safety belt 18', 18" towards the transverse center plane $P_T$ when the safety belt tensioners 24', 24" tensions the belts 18', 18". However, in other embodiments of the occupant restraint system 12 of the present invention, a four point safety belt may be provided with fewer or more safety belt tensioners and/or upper guide arrangements configured so as to displace a portion of the corresponding safety belt towards the transverse center plane $P_T$. Purely by way of example, only one 18' belt of a four point occupant restraint system 12 may be connected to an upper guide arrangements 20' adapted to allow the inward, i.e. towards the transverse center plane $P_T$, displacement of a safety belt portion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An occupant restraint system for a vehicle seat, comprising:
   a belt having a shoulder-belt portion extending diagonally across the seat between an upper portion of first side of the seat and a lower portion of a second side of the seat;
   an upper belt guide mountable adjacent to the upper first side of the seat and engaging the shoulder-belt to allow the belt to slide along the guide during belt retraction and extension;
   a safety sensor/control system generating a signal indicative of a condition requiring improved occupant restraint in the seat; and
   a guide actuator activated in response to the signal of the safety sensor/control system to displace the upper belt guide in a direction having a component coinciding with a transverse direction of the seat.

2. The occupant restraint system according to claim 1, wherein the guide actuator is adapted to be mounted to a roof support pillar of the vehicle.

3. The occupant restraint system according to claim 1, wherein upper belt guide is adapted to be mounted to a roof support pillar of the vehicle.

4. The occupant restraint system according to claim 1, wherein the upper belt guide is mounted for pivoting movement relative to the seat.

5. The occupant restraint system according to claim 1, wherein the direction of displacement of the upper belt has a further component coinciding with a backward direction of the seat.

6. The occupant restraint system according to claim 1, further comprising:
   a reversible belt tensioner activated in response to the signal of the safety sensor/control system to reversibly apply tension to the belt.

7. The occupant restraint system according to claim 1, further comprising:
   a support arm having an upper end adapted for mounting above the upper first side of the seat and extending downward toward the first side of the seat, the guide member attached to a lower end of the support arm, the guide actuator displacing the lower end and the upper guide member.

8. The occupant restraint system according to claim 7, wherein the upper end of the support arm is adapted for pivoting mounting above the upper first side of the seat.

9. A vehicle seat and restraint assembly, comprising:
   a seat having a backrest, the backrest having a first side and an opposite second side;
   a belt having a shoulder-belt portion extending diagonally across the seat between an upper portion of first side of the backrest and a lower portion of the second side for restraining an occupant in the seat;
   an upper belt guide mountable adjacent to the upper portion of the backrest first side and engaging the shoulder-belt portion to allow the belt to slide along the guide during belt retraction and extension;
   a safety sensor/control system generating a signal indicative of a vehicle condition requiring improved occupant restraint in the seat; and
   a guide actuator activated in response to the signal of the safety sensor/control system to displace the upper belt guide in a transverse direction toward the second side of the seat.

10. The assembly according to claim 9, wherein the guide actuator is adapted to be mounted to a roof support pillar of the vehicle.

11. The assembly according to claim 9, wherein upper belt guide is adapted to be mounted to a roof support pillar of the vehicle.

12. The assembly according to claim 9, wherein the upper belt guide is mounted for pivoting movement relative to the seat.

13. The assembly according to claim 9, wherein the direction of displacement of the upper belt has a further component coinciding with a backward direction of the seat.

14. The assembly according to claim 9, further comprising:
   a reversible belt tensioner activated in response to the signal of the safety sensor/control system to reversibly apply tension to the belt.

15. The assembly according to claim 9, further comprising:
   a support arm having an upper end adapted for mounting above the upper first side of the seat and extending downward toward the first side of the seat, the guide member attached to a lower end of the support arm, the guide actuator displacing the lower end and the upper guide member.

16. The assembly according to claim 15, wherein the upper end of the support arm is adapted for pivoting mounting above the upper first side of the seat.

17. An occupant restraint system for a seat mounted in a vehicle, comprising:
   a belt having a shoulder-belt portion extending diagonally across the seat between an upper outboard portion of the seat and a lower inboard portion of the seat;
   an upper belt guide mountable adjacent to the upper outboard portion of the seat and engaging the shoulder-belt to allow sliding movement of the belt during belt retraction and extension;
   a safety sensor/control system generating a signal indicative of a condition requiring improved occupant restraint in the seat; and
   a guide actuator mountable adjacent to the upper outboard portion of the seat and activated in response to the signal of the safety sensor/control system to displace the upper belt guide in a direction having an inboard component.

18. The occupant restraint system according to claim 17, wherein the guide actuator is adapted to be mounted to a roof support pillar of the vehicle.

19. The occupant restraint system according to claim 17, wherein upper belt guide is adapted to be mounted to a roof support pillar of the vehicle.

20. The occupant restraint system according to claim 17, further comprising:
   a reversible belt tensioner activated in response to the signal of the safety sensor/control system to reversibly apply tension to the belt.

* * * * *